United States Patent
Ozaki et al.

(10) Patent No.: US 12,180,311 B2
(45) Date of Patent: Dec. 31, 2024

(54) METHOD FOR PRODUCING ACRYLIC RUBBER

(71) Applicant: Osaka Soda Co., Ltd., Osaka (JP)

(72) Inventors: Taro Ozaki, Osaka (JP); Motoki Kitagawa, Osaka (JP); Masatsugu Naitou, Osaka (JP); Ryo Okada, Osaka (JP)

(73) Assignee: Osaka Soda Co., Ltd., Osaka (JP)

( * ) Notice: Subject to any disclaimer, the term of this patent is extended or adjusted under 35 U.S.C. 154(b) by 655 days.

(21) Appl. No.: 17/310,705

(22) PCT Filed: Mar. 18, 2020

(86) PCT No.: PCT/JP2020/012008
§ 371 (c)(1),
(2) Date: Aug. 18, 2021

(87) PCT Pub. No.: WO2020/203301
PCT Pub. Date: Oct. 8, 2020

(65) Prior Publication Data
US 2022/0185913 A1 Jun. 16, 2022

(30) Foreign Application Priority Data

Mar. 29, 2019 (JP) .................. 2019-065497

(51) Int. Cl.
| | |
|---|---|
| *C08F 2/24* | (2006.01) |
| *C08F 6/22* | (2006.01) |
| *C08F 220/18* | (2006.01) |
| *C08F 220/28* | (2006.01) |

(52) U.S. Cl.
CPC .................. *C08F 2/24* (2013.01); *C08F 6/22* (2013.01); *C08F 220/1802* (2020.02); *C08F 220/1804* (2020.02); *C08F 220/281* (2020.02)

(58) Field of Classification Search
CPC ...... C08F 2/24; C08F 6/22; C08F 2/22; C08F 20/18; C08F 220/281; C08F 4/40; C08F 220/1802; C08F 220/1804; C08J 3/24; C08K 3/04; C08K 5/0025; C08C 1/00; C08C 1/15
See application file for complete search history.

(56) References Cited

FOREIGN PATENT DOCUMENTS

| | | |
|---|---|---|
| EP | 3533807 A1 | 9/2019 |
| EP | 3575345 A1 | 12/2019 |
| JP | 2004-300386 * | 10/2004 |
| JP | 2016-213493 A | 12/2016 |
| JP | 6394834 B1 | 9/2018 |
| WO | WO 2018/079783 A1 | 5/2018 |
| WO | WO 2018/079784 A1 | 5/2018 |
| WO | WO 2018/079785 A1 | 5/2018 |
| WO | WO 2018/079786 A1 | 5/2018 |
| WO | WO 2018/079787 * | 5/2018 |
| WO | WO 2018/079787 A1 | 5/2018 |
| WO | WO 2018/139466 A1 | 8/2018 |

OTHER PUBLICATIONS

Translation of JP 2004-300386 (Year: 2004).*
Translation of WO 2018/079787 (Year: 2018).*
International Search Report in PCT/JP2020/012008 issued Jun. 16, 2020.

* cited by examiner

*Primary Examiner* — Robert C Boyle
(74) *Attorney, Agent, or Firm* — Knobbe, Martens, Olson & Bear, LLP

(57) ABSTRACT

There is provided a method for more easily producing an acrylic rubber capable of providing a crosslinked rubber having excellent water resistance. A method for producing an acrylic rubber comprising the steps of subjecting a monomer to emulsion polymerization to obtain a polymerized emulsion; mixing the polymerized emulsion with a coagulant to obtain a water-containing crumb; and water-washing the water-containing crumb, wherein, in the step of water-washing the water-containing crumb, the water-containing crumb is water-washed until an electrical conductivity of the washing water after water-washing the water-containing crumb becomes 6.0 mS/cm or less.

8 Claims, No Drawings

METHOD FOR PRODUCING ACRYLIC RUBBER

TECHNICAL FIELD

The present invention relates to a method for producing an acrylic rubber, and more particularly to a method for producing an acrylic rubber capable of providing a crosslinked rubber having excellent water resistance.

BACKGROUND ART

Acrylic rubber, which is a polymer containing an acrylic acid ester as a main component, is generally known as a rubber that is excellent in heat resistance, oil resistance, and ozone resistance, and is extensively used in the automobile industry.

Such acrylic rubber is typically obtained by subjecting a monomer mixture for forming the acrylic rubber to emulsion polymerization, and drying a water-containing crumb (i.e., water-containing acrylic rubber) obtained by adding a coagulant to the resulting polymerized emulsion.

In recent years, automotive parts, for example, parts such as sealing materials, hose materials, vibration damping materials, tube materials, belt materials, or boot materials, have been required to be excellent in not only heat resistance and oil resistance, but also water resistance. Since the residual amount of coagulant in acrylic rubber affects the water resistance of the crosslinked acrylic rubber, the step of removing it as much as possible is required. Patent Literatures 1 and 2 disclose the step of washing the water-containing crumb obtained in the coagulation step, in order to reduce the residual amount of coagulant in the acrylic rubber. However, these literatures do not disclose any control methods other than the number of water-washings. Patent Literature 2 discloses measured values of the residual amount of coagulant in the acrylic rubber; however, from the viewpoint of the time and cost required to analyze a small amount of coagulant, it is difficult to measure the residual amount of coagulant by performing the analysis step during the production. Therefore, there is a need for a method for more easily controlling the residual amount of coagulant in the acrylic rubber without impairing the water resistance of the crosslinked acrylic rubber.

CITATION LIST

Patent Literature

Patent Literature 1: JP 2016-213493 A
Patent Literature 2: Japanese Patent No. 6394834

SUMMARY OF INVENTION

Technical Problem

The present invention has been made in view of such circumstances. It is an object of the present invention to provide a method for more easily producing an acrylic rubber capable of providing a crosslinked rubber having excellent water resistance.

Solution to Problem

As a result of their extensive research to achieve the foregoing object, the present inventors have found that the object can be achieved when, in the step of water-washing a water-containing crumb obtained by adding a coagulant to a polymerized emulsion obtained by subjecting a monomer for forming an acrylic rubber to emulsion polymerization, the water-containing crumb is water-washed until an electrical conductivity of the washing water becomes 6.0 mS/cm or less, thus completing the present invention. Conventionally, the water-containing crumb is not washed until the washing water (usually, the electrical conductivity of the washing water before water-washing the water-containing crumb is 0.1 mS/cm or less) shows such a low electrical conductivity. The water-containing crumb is also not water-washed until the electrical conductivity becomes 6.0 mS/cm or less, nor is controlled the electrical conductivity of the washing water for the water-containing crumb.

Embodiments of the present invention are as follows:

Item 1. A method for producing an acrylic rubber comprising the steps of:
  subjecting a monomer to emulsion polymerization to obtain a polymerized emulsion;
  mixing the polymerized emulsion with a coagulant to obtain a water-containing crumb; and
  water-washing the water-containing crumb, wherein
  in the step of water-washing the water-containing crumb, the water-containing crumb is water-washed until an electrical conductivity of the washing water after water-washing the water-containing crumb becomes 6.0 mS/cm or less.

Item 2. The method for producing an acrylic rubber according to item 1, further comprising a drying step after the step of water-washing the water-containing crumb.

Item 3. A method for producing an acrylic rubber-containing composition, further comprising the step of blending a crosslinking agent into the acrylic rubber obtained by the method for producing an acrylic rubber according to item 1 or 2.

Item 4. A method for producing a crosslinked acrylic rubber, further comprising the step of crosslinking the acrylic rubber composition obtained by the method for producing an acrylic rubber-containing composition according to item 3.

Item 5. A water-containing crumb of an acrylic rubber, wherein
  when the water-containing crumb is water-washed, an electrical conductivity of the water becomes 6.0 mS/cm or less.

Advantageous Effects of Invention

The present invention provides a method for easily producing an acrylic rubber having excellent water resistance. A rubber material produced using a composition containing the acrylic rubber of the present invention (specifically a crosslinked product obtained by crosslinking the composition) has excellent water resistance, and thus, is suitable for use as a rubber material for automotive parts, for example, parts such as sealing materials, hose materials, vibration damping materials, tube materials, belt materials, or boot materials.

DESCRIPTION OF EMBODIMENTS

A method for producing an acrylic rubber of the present invention is a method for producing an acrylic rubber comprising the steps of subjecting a monomer to emulsion polymerization to obtain a polymerized emulsion; mixing the polymerized emulsion with a coagulant to obtain a water-containing crumb; and water-washing the water-containing crumb, wherein, in the step of water-washing the water-containing crumb, the water-containing crumb is water-washed until an electrical conductivity of the washing water for the water-containing crumb becomes 6.0 mS/cm or less. Because of these features, the method for producing an acrylic rubber of the present invention can produce an acrylic rubber having excellent water resistance. Hereinafter, the method for producing an acrylic rubber of the present invention, a water-containing crumb (water-containing acrylic rubber) obtained by the method, and a method for producing a crosslinked acrylic rubber that employs the method will be described in detail.

The acrylic rubber produced by the method of the present invention is a polymer containing a structural unit derived from a (meth)acrylic acid ester as a main component. By "main component" is meant that the content of the structural unit derived from a (meth)acrylic acid ester is 50% by mass or more. "(Meth)acrylic acid ester" refers to "acrylic acid ester or methacrylic acid ester", and the same applies to similar expressions as used herein.

The structural unit derived from a (meth)acrylic acid ester may, for example, be a structural unit derived from a (meth)acrylic acid alkyl ester and/or a structural unit derived from a (meth)acrylic acid alkoxyalkyl ester, preferably a structural unit derived from an acrylic acid alkyl ester having a $C_{1-8}$ alkyl group and/or a structural unit derived from an acrylic acid alkoxyalkyl ester having a $C_{2-8}$ alkoxyalkyl group, more preferably a structural unit derived from an acrylic acid alkyl ester having a $C_{2-6}$ alkyl group and/or a structural unit derived from an acrylic acid alkoxyalkyl ester having a $C_{2-6}$ alkoxyalkyl group, and particularly preferably a structural unit derived from an acrylic acid alkyl ester having a $C_{2-4}$ alkyl group and/or a structural unit derived from an acrylic acid alkoxyalkyl ester having a $C_{2-4}$ alkoxyalkyl group. The structural unit derived from a (meth)acrylic acid ester may be a structural unit derived from a single (meth)acrylic acid ester or two or more (meth)acrylic acid esters.

Specific examples of (meth)acrylic acid esters include (meth)acrylic acid esters such as methyl (meth)acrylate, ethyl (meth)acrylate, n-propyl (meth)acrylate, isopropyl (meth)acrylate, n-butyl (meth)acrylate, isobutyl (meth)acrylate, n-pentyl (meth)acrylate, n-hexyl (meth)acrylate, n-heptyl (meth)acrylate, n-octyl (meth)acrylate, 2-ethylhexy (meth)acrylate, and cyclohexyl (meth)acrylate, with ethyl (meth)acrylate and n-butyl (meth)acrylate being preferred.

Specific examples of (meth)acrylic acid alkoxyalkyl esters include (meth)acrylic acid esters such as methoxymethyl (meth)acrylate, methoxyethyl (meth)acrylate, ethoxymethyl (meth)acrylate, 2-ethoxyethyl (meth)acrylate, 2-propoxyethyl (meth)acrylate, 2-butoxyethyl (meth)acrylate, 2-methoxypropyl (meth)acrylate, 2-ethoxypropyl (meth)acrylate, 3-methoxypropyl (meth)acrylate, 3-ethoxypropyl (meth)acrylate, 4-methoxybutyl (meth)acrylate, and 4-ethoxybutyl (meth)acrylate, with methoxyethyl (meth)acrylate being preferred.

The content of the structural unit derived from a (meth)acrylic acid ester in the acrylic rubber of the present invention is more preferably 50% by mass or more, and particularly preferably 60% by mass or more, relative to the total content of structural units of the acrylic rubber. The upper limit is preferably 99.5% by mass or less, more preferably 99% by mass or less, and particularly preferably 97.5% by mass or less.

The acrylic rubber of the present invention contains a structural unit derived from an unsaturated monomer having a crosslinking group. Examples of the structural unit derived from an unsaturated monomer having a crosslinking group include a structural unit derived from an unsaturated monomer having a halogen group (such as a chlorine group), a structural unit derived from an unsaturated monomer having a carboxy group, and a structural unit derived from an unsaturated monomer having an epoxy group, with the structural unit derived from an unsaturated monomer having a halogen group (particularly a chlorine group) or a carboxy group being particularly preferred.

Examples of the unsaturated monomer having a halogen group include vinyl monochloroacetate and allyl chloroacetate, with vinyl monochloroacetate being preferred.

Examples of the unsaturated monomer having a carboxy group include unsaturated monocarboxylic acids, such as (meth)acrylic acid, crotonic acid, 2-pentenoic acid, and cinnamic acid; unsaturated dicarboxylic acids, such as fumaric acid, maleic acid, and itaconic acid; carboxylic acid anhydrides, such as maleic anhydride and citraconic anhydride; butenedioic acid mono-chain alkyl esters, such as monomethyl fumarate, monoethyl fumarate, mono-n-butyl fumarate, monomethyl maleate, monoethyl maleate, mono-2-ethylhexyl maleate, and mono-n-butyl maleate; butenedioic acid mono-cyclic alkyl esters, such as monocyclopentyl fumarate, monocyclohexyl fumarate, monocyclopentyl maleate, and monocyclohexyl maleate; and itaconic acid monoesters, such as monomethyl itaconate, monoethyl itaconate, mono-n-butyl itaconate, and monocyclohexyl itaconate. Preferred among the above are unsaturated dicarboxylic acid monoesters, such as monoethyl fumarate, monopropyl fumarate, monobutyl fumarate, monoethyl itaconate, monopropyl itaconate, and monobutyl itaconate.

Examples of the unsaturated monomer having an epoxy group include glycidyl (meth)acrylate and (meth)allyl glycidyl ether.

The content of the structural unit derived from an unsaturated monomer having a crosslinking group in the acrylic rubber, relative to the total content of structural units in the acrylic rubber, is preferably 0.1% by mass or more, more preferably 0.3% by mass or more, and particularly preferably 0.5% by mass or more, while it is preferably 10% by mass or less, more preferably 5% by mass or less, and particularly preferably 2.5% by mass or less. The above-defined range of the content of the structural unit derived from an unsaturated monomer having a crosslinking group is preferred in terms of processability and physical properties, such as strength and permanent compression set.

Besides the above-described structural units, the acrylic rubber of the present invention may further contain structural units derived from other monomers copolymerizable with these structural units. Examples of other structural units include a structural unit derived from an ethylenically unsaturated nitrile, a structural unit derived from a (meth)acrylamide-based monomer, a structural unit derived from an aromatic vinyl-based monomer, a structural unit derived from a conjugated diene-based monomer, a structural unit derived from a nonconjugated diene, and structural units derived from other olefins.

Examples of ethylenically unsaturated nitriles include compounds such as acrylonitrile, methacrylonitrile, α-methoxyacrylonitrile, and vinylidene cyanide.

Examples of (meth)acrylamide-based monomers include compounds such as acrylamide, methacrylamide, diacetone acrylamide, diacetone methacrylamide, N-butoxymethylacrylamide, N-butoxymethylmethacrylamide, N-butoxyethylacrylamide, N-butoxyethylmethacrylamide, N-methoxymethylacrylamide, N-methoxymethylmethacrylamide, N-propyoxymethylacrylamide, N-propyoxymethylmethacrylamide, N-methylacrylamide, N-methylmethacrylamide, N,N-dimethylacrylamide, N,N-dimethylmethacrylamide, N,N-diethylacrylamide, N,N-diethylmethacrylamide, N-methylolacrylamide, N-methylolmethacrylamide, ethacrylamide, crotonamide, cinnamamide, maleic acid diamide, itaconic acid diamide, methylmaleic acid amide, methylitaconic acid amide, maleic acid imide, and itaconic acid imide.

Examples of aromatic vinyl-based monomers include compounds such as styrene, α-methylstyrene, o-methylstyrene, p-methylstyrene, o-ethylstyrene, p-ethylstyrene, α-fluorostyrene, p-trifluoromethylstyrene, p-methoxystyrene, p-aminostyrene, p-dimethylaminostyrene, p-acetoxystyrene, styrenesulfonic acids or salts thereof, α-vinylnaphthalene, 1-vinylnaphthalene-4-sulfonic acid or salts thereof, 2-vinylfluorene, 2-vinylpyridine, 4-vinylpyridine, divinylbenzene, diisopropenylbenzene, and vinylbenzyl chloride.

Examples of conjugated diene-based monomers include compounds such as 1,3-butadiene, 2-methyl-1,3-butadiene, 2-chloro-1,3-butadiene, 1,2-dichloro-1,3-butadiene, 2,3-dichloro-1,3-butadiene, 2,3-dimethyl-1,3-butadiene, 2-neopentyl-1,3-butadiene, 2-bromo-1,3-butadiene, 2-cyano-1,3-butadiene, 1,3-pentadiene, 1,3-hexadiene, chloroprene, and piperylene.

Examples of the structural unit derived from a nonconjugated diene also include structural units derived from nonconjugated diene compounds such as 1,4-pentadiene, 1,4-hexadiene, ethylidene norbornene, norbornadiene, and dicyclopentadiene.

Examples of other olefin-based monomers include esters such as dicyclopentadienyl acrylate, dicyclopentadienyl methacrylate, dicyclopentadienyl ethyl acrylate, and dicyclopentadienyl ethyl methacrylate; and compounds such as ethylene, propylene, vinyl chloride, vinylidene chloride, 1,2-dichloroethylene, vinyl acetate, vinyl fluoride, vinylidene fluoride, 1,2-difluoroethylene, vinyl bromide, vinylidene bromide, 1,2-dibromoethylene, ethyl vinyl ether, and butyl vinyl ether.

When the acrylic rubber of the present invention contains structural units derived from these other copolymerizable monomers, the content of the monomers relative to the total content of structural units may be 0 to 45% by mass, preferably 0 to 20% by mass.

A method for producing an acrylic rubber of the present invention is a method for producing an acrylic rubber comprising the steps of subjecting a monomer to emulsion polymerization to obtain a polymerized emulsion; mixing the polymerized emulsion with a coagulant to obtain a water-containing crumb; and water-washing the water-containing crumb, wherein, in the step of water-washing the water-containing crumb, the water-containing crumb is water-washed until an electrical conductivity of the washing water after water-washing the water-containing crumb becomes 6.0 mS/cm or less.

The step of subjecting a monomer to emulsion polymerization to obtain a polymerized emulsion will now be described. Hereinafter, this step may also be referred to as the emulsion polymerization step.

The emulsion polymerization step is the step of subjecting a monomer for forming the acrylic rubber to emulsion polymerization to obtain a polymerized emulsion.

The emulsion polymerization step may be performed using a typical method, using conventionally known emulsifiers, polymerization initiators, chain transfer agents, polymerization terminators, and the like that are commonly used.

The emulsifier is not limited, and may be a nonionic emulsifier, an anionic emulsifier, or the like that is commonly used in emulsion polymerization. Examples of nonionic emulsifiers include polyoxyethylene alkyl ethers, polyoxyethylene alcohol ethers, polyoxyethylene alkyl phenyl ethers, polyoxyethylene polycyclic phenyl ethers, polyoxyalkylene alkyl ethers, sorbitan fatty acid esters, polyoxyethylene fatty acid esters, and polyoxyethylene sorbitan fatty acid esters. Examples of anionic emulsifiers include alkylbenzene sulfonates, alkyl sulfates, polyoxyethylene alkyl ether sulfates, polyoxyalkylene alkyl ether phosphates or salts thereof, polyoxyalkylene alkylphenyl ether phosphates, salts thereof, or fatty acid salts thereof. These emulsifiers may be used alone or in combination.

The emulsifier may be used in an amount that is commonly used in emulsion polymerization. Specifically, the amount of the emulsifier may be in the range of 0.01 to 10% by mass, preferably 0.03 to 7% by mass, and more preferably 0.05 to 5% by mass, relative to the amount of the charged monomers. When a reactive surfactant is used as a monomer component, the addition of emulsifier is not necessarily required.

The polymerization initiator is not limited, and may be a polymerization initiator that is commonly used in emulsion polymerization. Specific examples include inorganic polymerization initiators represented by persulfates, such as potassium persulfate, sodium persulfate, and ammonium persulfate; organic peroxide-based polymerization initiators, such as 2,2-di(4,4-di-(t-butylperoxy)cyclohexyl)propane, 1-di-(t-hexylperoxy)cyclohexane, 1,1-di-(t-butylperoxy)cyclohexane, n-butyl 4,4-di-(t-butylperoxy)valerate, 2,2-di(t-butylperoxy)butane, t-butyl hydroperoxide, cumene hydroperoxide, diisopropylbenzene hydroperoxide, p-menthane hydroperoxide, 1,1,3,3-tetramethylbutyl hydroperoxide, t-butyl cumyl peroxide, di-t-butyl peroxide, di-t-hexyl peroxide, di(2-t-butylperoxyisopropyl)benzene, dicumyl peroxide, diisobutyryl peroxide, di(3,5,5-trimethylhexanoyl) peroxide, dilauroyl peroxide, disuccinic acid peroxide, dibenzoyl peroxide, di(3-methylbenzoyl) peroxide, benzoyl(3-methylbenzoyl) peroxide, diisopropyl peroxydicarbonate, di-n-propyl peroxydicarbonate, di(4-t-butylcyclohexyl) peroxydicarbonate, di(2-ethylhexyl) peroxydicarbonate, di-sec-butyl peroxydicarbonate, cumyl peroxyneodecanoate, 1,1,3,3-tetramethylbutyl peroxyneodecanoate, t-hexyl peroxyneodecanoate, t-butyl peroxyneodecanoate, t-hexyl peroxypivalate, t-butyl peroxypivalate, 2,5-dimethyl-2,5-di(2-ethylhexanoylperoxy)hexane, 1,1,3,3-tetramethylbutyl peroxy-2-ethylhexanoate, t-hexyl peroxy-2-ethylhexanoate, t-butyl peroxy-2-ethylhexanoate, t-butylperoxy laurate, t-butylperoxy-3,5,5-trimethylhexanoate, t-hexylperoxyisopropyl monocarbonate, t-butylperoxyisopropyl monocarbonate, t-butylperoxy-2-ethylhexyl monocarbonate, 2,5-dimethyl-2,5-di(benzoylperoxy)hexane, t-butylperoxy acetate, t-hexylperoxy benzoate, t-butylperoxy benzoate, and 2,5-dimethyl-2,5-di(t-butylperoxy)hexane; and azo-based initiators, such as hydroperoxides, azobisisobutyronitrile, 4-4'-azobis(4-cyanovaleric acid), 2-2'-azobis[2-(2-imidazolin-2-yl)propane, 2-2'-azobis(propane-2-carboamidine) 2-2'-azobis[N-(2-carboxyethyl)-2-methylpropanamide, 2-2'-azobis{2-[1-(2-hydroxyethyl)-2-imidazolin-2-yl]propane}, 2-2'-azobis(1-imino-1-pyrrolidino-2-methylpropane), and 2-2'-azobis{2-methyl-N-[1,1-bis(hydroxymethyl)-2-hydroxyethyl]propanamide}.

These polymerization initiators may be used alone or in combination.

The polymerization initiator may be used in an amount that is commonly used in emulsion polymerization. Specifically, the amount of the polymerization initiator may be in the range of 0.01 to 5% by mass, preferably 0.01 to 4% by mass, and more preferably 0.02 to 3% by mass, relative to the amount of the charged monomers.

An organic peroxide or an inorganic peroxide serving as the polymerization initiator may be combined with a reducing agent and used as a redox polymerization initiator. Examples of the reducing agent to be used in combination include, but are not limited to, compounds containing metal ions in a reduced state, such as ferrous sulfate and copper(I) naphthenate, methane compounds, such as sodium methanesulfonate, amine compounds, such as dimethylaniline, ascorbic acid and salts thereof, and reducing inorganic salts, such as alkali metal salts of sulfurous acid and thiosulfuric acid. These reducing agents may be used alone or in combination. The reducing agent is preferably used in an amount of 0.0003 to 10.0 parts by mass per 100 parts by mass of the charged monomers.

A chain transfer agent may be optionally used. Specific examples of chain transfer agents include alkyl mercaptans, such as n-hexyl mercaptan, n-octyl mercaptan, t-octyl mercaptan, n-dodecyl mercaptan, t-dodecyl mercaptan, and n-stearyl mercaptan; xanthogen compounds, such as 2,4-diphenyl-4-methyl-1-pentene, 2,4-diphenyl-4-methyl-2-pentene, dimethyl xanthogendisulfide, and diisopropyl xanthogendisulfide; thiuram-based compounds, such as terpinolene, tetramethyl thiuram disulfide, tetraethyl thiuram disulfide, and tetramethyl thiuram monosulfide; phenol-based compounds, such as 2,6-di-t-butyl-4-methylphenol and styrenated phenol; allyl compounds, such as allyl alcohol; halogenated hydrocarbon compounds, such as dichloromethane, dibromomethane, and carbon tetrabromide; vinyl ethers, such as α-benzyloxystyrene, α-benzyloxyacrylonitrile, and α-benzyloxyacrylamide; triphenyl ethane, pentaphenyl ethane, acrolein, methacrolein, thioglycolic acid, thiomalic acid, and 2-ethylhexyl thioglycolate. These chain transfer agents may be used alone or in combination. The chain transfer agent is typically used in an amount of 0 to 5 parts by mass per 100 parts by mass of the charged monomers, although the amount is not limited thereto.

Examples of polymerization terminators include hydroxylamines, hydroxyamine sulfates, diethylhydroxyamine, hydroxyamine sulfonic acid and alkali metal salts thereof, sodium dimethyldithiocarbamate, and quinone compounds such as hydroquinone. The polymerization terminator is typically used in an amount of 0 to 2 parts by mass per 100 parts by mass of total monomers, although the amount is not limited thereto.

Besides the above-described components, polymerization auxiliary materials, such as particle size adjusters, chelating agents, and oxygen scavengers, may be used.

Emulsion polymerization may be performed in any of batch mode, semi-batch mode, and continuous mode. The polymerization time and the polymerization temperature are not limited. While the polymerization time and the polymerization temperature may be selected appropriately according to the type of the polymerization initiator to be used and the like, the polymerization temperature is typically 10 to 100° C., and the polymerization time is typically 0.5 to 100 hours.

The step of mixing the polymerized emulsion with a coagulant to obtain a water-containing crumb will now be described. Hereinafter, this step may also be referred to as the coagulation step.

The coagulant to be used in the coagulation step is preferably an inorganic metal salt, although not limited thereto. Specific examples of inorganic metal salts include sodium sulfate, magnesium sulfate, aluminum sulfate, sodium chloride, and calcium chloride.

The coagulation with a coagulant may be performed using any commonly used methods without limitation. One exemplary method is to feed the polymerized emulsion into an aqueous solution containing a coagulant continuously or in a batchwise manner, which yields a water-containing crumb (water-containing acrylic rubber). Here, the temperature of the aqueous solution containing the coagulant is generally in the range of 50° C. or more, preferably in the range of 60 to 100° C., although the temperature of the aqueous solution cannot be uniformly specified because it is affected by factors such as the type of the monomer and the amount used, as well as the shear force and the like due to stirring.

The step of water-washing the water-containing crumb will now be described. Hereinafter, this step may also be referred to as the water-washing step. In the water-washing step, the water-containing crumb is water-washed until an electrical conductivity of the washing water after water-washing the water-containing crumb becomes 6.0 mS/cm or less.

The water-washing step is intended to remove the coagulant contained in the water-containing crumb.

The electrical conductivity of the water (washing water) after water-washing the water-containing crumb is 6.0 mS/cm or less, preferably 4.5 mS/cm or less, and particularly preferably 3.0 mS/cm or less. While the electrical conductivity of the washing water after water-washing the water-containing crumb is not limited, it may be 0.1 mS/cm or more, even 0.3 mS/cm or more. As stated above, the electrical conductivity of the washing water before water-washing that is used in the water-washing of the water-containing crumb is usually 0.1 mS/cm or less; similarly in the present invention, the washing water for the water-containing crumb is preferably water with an electrical conductivity of 0.1 mS/cm or less.

The electrical conductivity of the water after water-washing the water-containing crumb is measured as follows: A slurry formed by adding 3500 parts by mass of ion-exchanged water per 100 parts by mass of solids contained in the water-containing crumb is stirred until a predetermined time. Here, the ion-exchanged water is replaced with fresh ion-exchanged water, if the water-containing crumb was not previously sufficiently water-washed. After the water-washed water-containing crumb is removed, the water-containing crumb is added to 3500 parts by mass of fresh ion-exchanged water and stirred for 5 minutes; thereafter, the stirring is stopped, and, after settling of the crumb is confirmed, 100 mL of the supernatant is collected. The electrical conductivity at 23° C. of the collected supernatant is measured using the AC two-electrode method. The electrical conductivity can be measured using the portable electrical conductivity meter ES-51 from HORIBA, Ltd. and the general-purpose waterproof electrical conductivity cell 9382-10D from HORIBA, Ltd.

The step of drying the water-containing crumb after the water-washing will now be described. Hereinafter, this step may also be referred to as the drying step.

The acrylic rubber can be obtained by removing the water from the water-containing crumb and drying. The drying is typically performed using a flash dryer, a fluidized bed dryer, or the like, although the method of drying is not limited thereto.

The drying temperature is preferably 50 to 250° C., and more preferably 80 to 200° C., although not limited thereto. The drying time depends on the drying temperature.

A dehydration step using a centrifuge or the like may be performed prior to the drying step.

The method of the present invention may include the step of adding a pH adjuster.

The pH adjuster may be a base, and specific examples of bases include sodium hydroxide, potassium hydroxide, calcium hydroxide, ammonia, inorganic ammonium compounds, and organic amine compounds.

From the viewpoint of processability, the thus-produced acrylic rubber to be used in the present invention preferably has a molecular weight in the range of 10 to 100, more preferably in the range of 15 to 90, and still more preferably in the range of 20 to 80, in terms of Mooney viscosity ($ML_{1+4}$) at 100° C. in the Mooney scorch test as defined in JIS K 6300.

<Acrylic Rubber-Containing Composition>

The acrylic rubber-containing composition of the present invention contains at least the above-described acrylic rubber and a crosslinking agent.

The crosslinking agent may be any of conventionally known crosslinking agents, such as polyamine compounds, polyepoxy compounds, polyisocyanate compounds, aziridine compounds, sulfur compounds, higher fatty acid metal salts (fatty acid metal soaps), and thiol compounds.

Examples of higher fatty acid metal salts include alkali metal salts or alkaline earth metal salts of fatty acids having $C_{8-18}$ alkyl or alkenyl groups, for example, sodium stearate, potassium stearate, potassium myristate, sodium palmitate, calcium stearate, magnesium stearate, sodium oleate, potassium oleate, and barium oleate. These higher fatty acid metal salts may be used alone or in combination.

Examples of polyamine compounds include aliphatic polyamine compounds, such as hexamethylenediamine, hexamethylenediamine carbamate, and N,N'-dicinnamylidene-1,6-hexanediamine; and aromatic polyamine compounds, such as 4,4'-methylenedianiline, m-phenylenediamine, 4,4'-diaminodiphenyl ether, 3,4'-diaminodiphenyl ether, 4,4'-(m-phenylenediisopropylidene)dianiline, 4,4'-(p-phenylenediisopropylidene)dianiline, 2,2'-bis[4-(4-aminophenoxy)phenyl]propane, 4,4'-diaminobenzanilide, 4,4'-bis(4-aminophenoxy)biphenyl, m-xylylene diamine, p-xylylene diamine, 1,3,5-benzenetriamine, 1,3,5-benzenetriaminomethyl, and isophthalic dihydrazide.

Examples of polyepoxy compounds include glycidyl ether-type epoxy compounds, such as phenol novolac-type epoxy compounds, cresol novolac-type epoxy compounds, cresol-type epoxy compounds, bisphenol A-type epoxy compounds, bisphenol F-type epoxy compounds, brominated bisphenol A-type epoxy compounds, brominated bisphenol F-type epoxy compounds, and hydrogenated bisphenol A-type epoxy compounds; and other polyepoxy compounds, such as cycloaliphatic epoxy compounds, glycidyl ester-type epoxy compounds, glycidyl amine-type epoxy compounds, and isocyanurate-type epoxy compounds.

Examples of polyisocyanate compounds include 2,4-tolylene diisocyanate, 2,6-tolylene diisocyanate, 4,4'-diphenylmethane diisocyanate, hexamethylene diisocyanate, p-phenylene diisocyanate, m-phenylene diisocyanate, 1,5-naphtylene diisocyanate, 1,3,6-hexamethylene triisocyanate, 1,6,11-undecane triisocyanate, and bicycloheptane triisocyanate.

Examples of aziridine compounds include tris-2,4,6-(1-aziridinyl)-1,3,5-triazine, tris[1-(2-methyl)aziridinyl]phosphinoxide, and hexa[1-(2-methyl)aziridinyl]triphosphatriazine.

Examples of sulfur compounds include sulfur, 4,4'-dithiomorpholine, tetramethyl thiuram disulfide, and tetraethyl thiuram disulfide.

Examples of thiol compounds include 1,3,5-triazine dithiol or derivatives thereof, and 1,3,5-triazine trithiols, such as 1,3,5-triazine-2,4,6-trithiol.

Examples of basic metal oxides include zinc oxide, lead oxide, calcium oxide, and magnesium oxide.

Examples of organic metal halides include dicyclopentadienyl metal dihalides, and examples of metals include titanium and zirconium.

These crosslinking agents may be used alone or in combination. The amount of the crosslinking agent may be 0.05 to 20 parts by mass, preferably 0.1 to 10 parts by mass, per 100 parts by mass of the acrylic rubber of the present invention.

The acrylic rubber-containing composition of the present invention may also optionally contain other additives that are typically used in the art, for example, lubricants, anti-aging agents, light stabilizers, fillers, reinforcing agents, plasticizers, processing aids, pigments, colorants, crosslinking accelerators, crosslinking aids, crosslinking retarding agents, antistatic agents, and foaming agents.

The acrylic rubber-containing composition of the present invention may be blended with rubbers, resins, and the like, in a manner that is typically used in the art, without departing from the spirit of the present invention. Examples of rubbers that may be used in the present invention include butadiene rubber, styrene-butadiene rubber, isoprene rubber, natural rubber, acrylonitrile-butadiene rubber, acrylonitrile-butadiene-isoprene rubber, ethylene-propylene-diene rubber, and epichlorohydrin rubber. Examples of resins include PMMA (polymethyl methacrylate) resin, PS (polystyrene) resin, PUR (polyurethane) resin, PVC (polyvinyl chloride) resin, EVA (ethylene/vinyl acetate) resin, AS (styrene/acrylonitrile) resin, and PE (polyethylene) resin.

The total amount of the rubbers and resins to be blended is 50 parts by mass or less, preferably 10 parts by mass or less, and more preferably 1 part by mass or less, per 100 parts by mass of the acrylic rubber of the present invention.

A method for producing an acrylic rubber-containing composition of the present invention comprises the step of blending a crosslinking agent into the acrylic rubber obtained by the above-described method for producing an acrylic rubber.

Blending of the acrylic rubber-containing composition of the present invention may be performed using any methods conventionally employed in the art of polymer processing, for example, an open roll, a Banbury mixer, and various kneaders.

The blending procedure may be a typical procedure used in the art of polymer processing. For example, blending may be performed by the following procedure: The polymer only is kneaded first, and then kneading A is performed in which compounding ingredients other than a crosslinking agent and a crosslinking accelerator are added, thus producing a kneading A compound, and thereafter, kneading B is performed in which a crosslinking agent and a crosslinking accelerator are added.

A crosslinked acrylic rubber is obtained by crosslinking the acrylic rubber-containing composition. A method for producing a crosslinked acrylic rubber of the present invention comprises the step of crosslinking the acrylic rubber-containing composition obtained by the above-described method for producing an acrylic rubber-containing composition.

The step of crosslinking the acrylic rubber-containing composition may heat the acrylic rubber-containing composition to a temperature of usually 100 to 250° C. to obtain a crosslinked product. While the crosslinking time varies with temperature, it is usually between 0.5 and 300 minutes. Crosslinking and molding may be performed by any of the following manners: crosslinking and molding are integrally performed; the acrylic rubber-containing composition that has been pre-molded is heated again to form a crosslinked product; and the acrylic rubber-containing composition is pre-heated, and the crosslinked product is subjected to processing for molding. Crosslinking and molding may be specifically performed using any methods, such as compression molding with a mold, injection molding, or heating with steam cans, air baths, infrared radiation, or microwaves.

Therefore, by utilizing the above-described properties, the crosslinked product of the present invention is suitably used as κ-rings, packings, diaphragms, oil seals, shaft seals, bearing seals, mechanical seals, wellhead seals, seals for electrical and electronic equipment, seals for pneumatic equipment, cylinder head gaskets mounted on joints between cylinder blocks and cylinder heads, rocker cover gaskets mounted on joints between rocker covers and cylinder heads, oil pan gaskets mounted on joints between oil pans and cylinder blocks or transmission cases, gaskets for fuel cell separators mounted between a pair of housings between which a unit cell including a positive electrode, an electrolyte plate, and a negative electrode is sandwiched, gaskets for top covers of hard disk drives, and other various gaskets.

The crosslinked product of the present invention can also be used as a rubber material, and can be suitably used as extruded articles and mold-crosslinked articles used for automotive applications, that is, as various hoses including fuel oil system hoses around fuel tanks such as fuel hoses, filler neck hoses, vent hoses, vapor hoses, and oil hoses, air system hoses such as turbo air hoses and emission control hoses, radiator hoses, heater hoses, brake hoses, and air-conditioner hoses.

EXAMPLES

The present invention will be described in more detail with reference to examples and comparative examples, although the present invention is not limited thereto.

In the examples and comparative examples, acrylic rubbers were produced, and acrylic rubber-containing compositions each containing the produced acrylic rubber and crosslinking agents were produced, and the physical properties of rubber materials produced using (specifically crosslinked products obtained by crosslinking) the acrylic rubber-containing compositions were evaluated.

<Method of Water-Washing Water-Containing Crumb>

In the examples and comparative examples, the polymerized emulsion was coagulated, and the resulting water-containing crumb was water-washed. The method of water-washing the water-containing crumb was as follows: A slurry formed by adding 3500 parts by mass of ion-exchanged water per 100 parts by mass of solids contained in the coagulated water-containing crumb was stirred until a predetermined time.

<Measurement of Electrical Conductivity of Washing Water>

The electrical conductivity of the washing water was measured in the examples and comparative examples as follows: After the water-washed water-containing crumb was removed, the water-containing crumb was added to 3500 parts by mass of fresh ion-exchanged water (electrical conductivity: 0.1 mS/cm or less) and stirred for 5 minutes; thereafter, the stirring was stopped, and, after settling of the crumb was confirmed, 100 mL of the supernatant was collected. The collected supernatant was placed in a 110-mL sample tube bottle. The electrical conductivity at 23° C. of the supernatant collected in the 110-mL sample tube bottle was measured using the AC two-electrode method. The electrical conductivity was measured using the portable electrical conductivity meter ES-51 from HORIBA, Ltd. and the general-purpose waterproof electrical conductivity cell 9382-10D from HORIBA, Ltd.

Example 11

Production of Acrylic Rubber A

A polymerization reactor equipped with a thermometer, a stirrer, a nitrogen gas inlet tube, and a pressure-reducing device was charged with 200 parts by mass of water, 1.7 parts by mass of a polyoxyalkylene alkyl ether phosphate, and 49.0 parts by mass of ethyl acrylate, 25.0 parts by mass of n-butyl acrylate, 24.8 parts by mass of 2-methoxyethyl acrylate, and 1.2 parts by mass of 2-chlorovinyl acetate as monomers. Degassing under a reduced pressure and nitrogen purging were repeated to sufficiently remove oxygen. Then, 0.1 part by mass of sodium ascorbate and 0.1 part by mass of potassium persulfate were added to initiate the emulsion polymerization reaction at ambient pressure and temperature. The reaction was continued until the polymerization conversion reached 95%, and 0.0075 part by mass of hydroquinone was added to terminate the polymerization. The resulting polymerized emulsion was coagulated with an aqueous aluminum sulfate solution, and the water-containing crumb was water-washed until the electrical conductivity of the washing water reached 1.7 mS/cm. The water-washed water-containing crumb was dried to obtain acrylic rubber A.

Example 2

Production of Acrylic Rubber B

Acrylic rubber B was obtained as in Example 1, except that the water-containing crumb was water-washed until the electrical conductivity of the washing water reached 1.9 mS/cm.

Example 3

Production of Acrylic Rubber C

Acrylic rubber C was obtained as in Example 1, except that the water-containing crumb was water-washed until the electrical conductivity of the washing water reached 4.3 mS/cm.

Example 4

Production of Acrylic Rubber D

Acrylic rubber D was obtained as in Example 1, except that the water-containing crumb was water-washed until the electrical conductivity of the washing water reached 0.4 mS/cm.

Comparative Example 1

Production of Acrylic Rubber E

Acrylic rubber E was obtained as in Example 1, except that the water-containing crumb was water-washed until the electrical conductivity of the washing water reached 7.1 mS/cm.

Comparative Example 21

Production of Acrylic Rubber F

Acrylic rubber F was obtained as in Example 1, except that the water-containing crumb was water-washed until the electrical conductivity of the washing water reached 26.9 mS/cm.

Comparative Example 31

Production of Acrylic Rubber G

Acrylic rubber G was obtained as in Example 1, except that the water-containing crumb was water-washed until the electrical conductivity of the washing water reached 63.8 mS/cm.

<Mooney Viscosity ($ML_{1+4}$), 100° C.>

For each of acrylic rubbers A to F, the Mooney viscosity ($ML_{1+4}$) at a measurement temperature of 100° C. was measured using Mooney Viscometer AM-3 from Toyo Seiki Co., Ltd., in accordance with the Mooney viscosity test of the method for testing the physical properties of uncrosslinked rubber as defined in JIS K 6300. The results are shown in Table 1.

Production of Acrylic Rubber-Containing Compositions

The ingredients of each formulation shown in Tables 2 and 3 were kneaded first in a kneader at 120° C. to prepare a kneading A compound. The kneading A compound was dispersed together with a crosslinking agent and a crosslinking accelerator on an open roll at room temperature to obtain a kneading D compound. The obtained kneading B compound was sheeted out on an open roll to obtain an uncrosslinked sheet with a thickness of 2 to 2.5 mm. In Tables 2 and 3, the compounding ingredients are expressed in part(s) by mass.

The uncrosslinked sheet obtained above was placed in a mold with a length of 15 cm, a width of 15 cm, and a depth of 0.2 cm, and subjected to primary crosslinking by pressing at 180° C. for 10 minutes; subsequently, the obtained primary crosslinked product was subjected to secondary crosslinking by further heating in a gear oven at 180° C. for 3 hours to obtain a sheet-like crosslinked product. The obtained crosslinked product was punched out with No. 3 dumbbell to produce a specimen. This specimen was then measured for tensile strength and elongation using AGS-5KNY from Shimadzu Corporation, in accordance with JIS K6251. The results are shown in Tables 4 and 5.

[Water Resistance]

The uncrosslinked sheet was placed in a mold with a length of 15 cm, a width of 15 cm, and a depth of 0.2 cm, and subjected to primary crosslinking by pressing at 180° C. for 10 minutes; subsequently, the obtained primary crosslinked product was subjected to secondary crosslinking by further heating in a gear oven at 180° C. for 3 hours to obtain a sheet-like crosslinked product. From the sheet of the crosslinked product, a 3×2×0.2 cm specimen was cut out, and the specimen was subjected to the immersion test as defined in JIS K6258, in which the specimen was immersed for 70 hours in distilled water (100 ml) adjusted to a temperature of 100° C. The rate of change in volume of the specimen before and after immersion was measured according to the following equation. The results are shown in Tables 4 and 5.

It can be evaluated that the lower the rate of change in volume before and after immersion is, the more the swelling in the water is suppressed, and the higher the water resistance is.

Rate of change (%) in volume before and after immersion=(volume of the specimen after immersion−volume of the specimen before immersion)÷volume of the specimen before immersion×100

TABLE 1

|  |  | Example | | | | Comparative Example | | |
| --- | --- | --- | --- | --- | --- | --- | --- | --- |
|  |  | 1 | 2 | 3 | 4 | 1 | 2 | 3 |
|  |  | Type of acrylic rubber | | | | | | |
|  |  | A | B | C | D | E | F | G |
| Composition (% by mass) of acrylic rubber | Ethyl acrylate | 49.0 | 49.0 | 49.0 | 49.0 | 49.0 | 49.0 | 49.0 |
|  | n-Butyl acrylate | 25.0 | 25.0 | 25.0 | 25.0 | 25.0 | 25.0 | 25.0 |
|  | 2-Methoxyethyl acrylate | 24.8 | 24.8 | 24.8 | 24.8 | 24.8 | 24.8 | 24.8 |
|  | Monochloro vinyl acetate | 1.2 | 1.2 | 1.2 | 1.2 | 1.2 | 1.2 | 1.2 |
| Washing water after washing the crumb | Electrical conductivity (mS/cm) | 1.7 | 1.9 | 4.3 | 0.4 | 7.1 | 26.9 | 63.8 |
| Mooney viscosity of acrylic rubber | Polymer Mooney (ML1 + 4) | 40 | 40 | 39 | 41 | 41 | 39 | 42 |

TABLE 2

Unit: part(s) by mass

|  | Example | | | | Comparative Example | | |
|---|---|---|---|---|---|---|---|
|  | 5 | 6 | 7 | 8 | 4 | 5 | 6 |
| Acrylic rubber A | 100 | | | | | | |
| Acrylic rubber B | | 100 | | | | | |
| Acrylic rubber C | | | 100 | | | | |
| Acrylic rubber D | | | | 100 | | | |
| Acrylic rubber E | | | | | 100 | | |
| Acrylic rubber F | | | | | | 100 | |
| Acrylic rubber G | | | | | | | 100 |
| FEF carbon | 60 | 60 | 60 | 60 | 60 | 60 | 60 |
| Stearic acid | 2 | 2 | 2 | 2 | 2 | 2 | 2 |
| 4,4'-Bis(α,α-dimethylbenzyl)diphenylamine | 2 | 2 | 2 | 2 | 2 | 2 | 2 |
| Kneading A compound | 164 | 164 | 164 | 164 | 164 | 164 | 164 |
| Zinc dibutyldithiocarbamate | 0.5 | 0.5 | 0.5 | 0.5 | 0.5 | 0.5 | 0.5 |
| 1,3,5-Triazine-2,4,6-trithiol | 1.5 | 1.5 | 1.5 | 1.5 | 1.5 | 1.5 | 1.5 |
| Kneading B compound | 166 | 166 | 166 | 166 | 166 | 166 | 166 |

TABLE 3

Unit: part(s) by mass

|  | Example | | | | Comparative Example | | |
|---|---|---|---|---|---|---|---|
|  | 9 | 10 | 11 | 12 | 7 | 8 | 9 |
| Acrylic rubber A | 100 | | | | | | |
| Acrylic rubber B | | 100 | | | | | |
| Acrylic rubber C | | | 100 | | | | |
| Acrylic rubber D | | | | 100 | | | |
| Acrylic rubber E | | | | | 100 | | |
| Acrylic rubber F | | | | | | 100 | |
| Acrylic rubber G | | | | | | | 100 |
| FEF carbon | 60 | 60 | 60 | 60 | 60 | 60 | 60 |
| Stearic acid | 2 | 2 | 2 | 2 | 2 | 2 | 2 |
| 4,4'-Bis(α,α-dimethylbenzyl)diphenylamine | 2 | 2 | 2 | 2 | 2 | 2 | 2 |
| Kneading A compound | 164 | 164 | 164 | 164 | 164 | 164 | 164 |
| Sulfur | 0.3 | 0.3 | 0.3 | 0.3 | 0.3 | 0.3 | 0.3 |
| Potassium stearate | 0.5 | 0.5 | 0.5 | 0.5 | 0.5 | 0.5 | 0.5 |
| Sodium stearate | 2.5 | 2.5 | 2.5 | 2.5 | 2.5 | 2.5 | 2.5 |
| Kneading B compound | 167.3 | 167.3 | 167.3 | 167.3 | 167.3 | 167.3 | 167.3 |

TABLE 4

|  |  | Example | | | | Comparative Example | | |
|---|---|---|---|---|---|---|---|---|
|  |  | 5 | 6 | 7 | 8 | 4 | 5 | 6 |
|  |  | Acrylic rubber used | | | | | | |
|  |  | A | B | C | D | E | F | G |
| Evaluation | Tensile strength (MPa) | 11.8 | 12.1 | 11.9 | 11.9 | 11.8 | 11.5 | 11.6 |
|  | Elongation (%) | 200 | 200 | 210 | 190 | 200 | 210 | 220 |
|  | Rate of change (%) in volume after the water resistance test | 30 | 30 | 29 | 29 | 36 | 37 | 50 |

TABLE 5

| | | Example | | | | Comparative Example | | |
|---|---|---|---|---|---|---|---|---|
| | | 9 | 10 | 11 | 12 | 7 | 8 | 9 |
| | | | | | Acrylic rubber used | | | |
| | | A | B | C | D | E | F | G |
| Evaluation | Tensile strength (MPa) | 11.2 | 11.1 | 11.0 | 10.9 | 11.2 | 10.3 | 11.5 |
| | Elongation (%) | 250 | 260 | 270 | 260 | 270 | 250 | 260 |
| | Rate of change (%) in volume after the water resistance test | 55 | 53 | 55 | 56 | 75 | 80 | 112 |

As shown in Tables 4 and 5, the crosslinked products of Examples 4 to 9, each obtained by crosslinking the composition containing the acrylic rubber obtained by the method of the present invention, exhibited lower rates of change in volume after the water resistance test, compared to the crosslinked products of the comparative examples, in the water resistance test. The results have shown that the method of the present invention can easily produce an acrylic rubber that forms a crosslinked product having improved water resistance, by controlling the electrical conductivity of the water after water-washing.

INDUSTRIAL APPLICABILITY

The present invention can provide a method for easily producing an acrylic rubber having excellent water resistance. A rubber material obtained using a composition containing the acrylic rubber produced by the method (specifically a crosslinked product obtained by crosslinking the composition) has excellent water resistance, and thus, is suitable for use as a rubber material for automotive parts, for example, parts such as sealing materials, hose materials, vibration damping materials, tube materials, belt materials, or boot materials.

The invention claimed is:

1. A method for producing an acrylic rubber comprising the steps of:
    subjecting a monomer to emulsion polymerization to obtain a polymerized emulsion;
    mixing the polymerized emulsion with a coagulant to obtain a water-containing crumb; and
    water-washing the water-containing crumb,
    wherein, in the step of water-washing the water-containing crumb, the water-containing crumb is water-washed until an electrical conductivity of the washing water after water-washing the water-containing crumb becomes 6.0 mS/cm or less.

2. The method for producing an acrylic rubber according to claim 1, further comprising a drying step after the step of water-washing the water-containing crumb.

3. A method for producing an acrylic rubber-containing composition, further comprising the step of blending a crosslinking agent into the acrylic rubber obtained by the method for producing an acrylic rubber according to claim 1.

4. A method for producing a crosslinked acrylic rubber, further comprising the step of crosslinking the acrylic rubber composition obtained by the method for producing an acrylic rubber-containing composition according to claim 3.

5. A water-containing crumb of an acrylic rubber, wherein when the water-containing crumb is water-washed, an electrical conductivity of the water becomes 6.0 mS/cm or less.

6. A method for producing an acrylic rubber-containing composition, further comprising the step of blending a crosslinking agent into the acrylic rubber obtained by the method for producing an acrylic rubber according to claim 2.

7. A method for producing a crosslinked acrylic rubber, further comprising the step of crosslinking the acrylic rubber composition obtained by the method for producing an acrylic rubber-containing composition according to claim 6.

8. The method of claim 1, further comprising a step of measuring the electrical conductivity of the water after water-washing the water-containing crumb.

* * * * *